Figure 1:
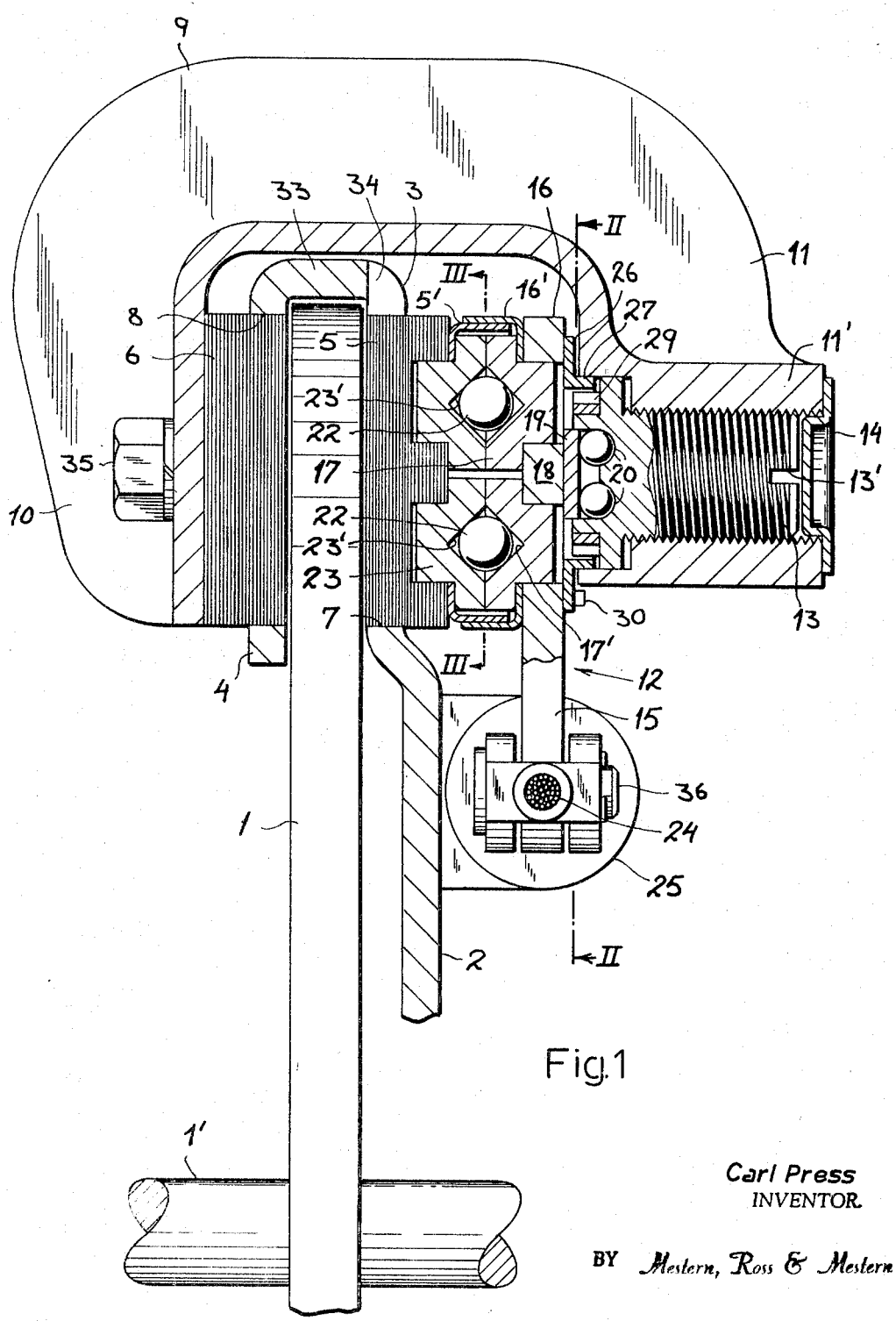

Carl Press
INVENTOR.

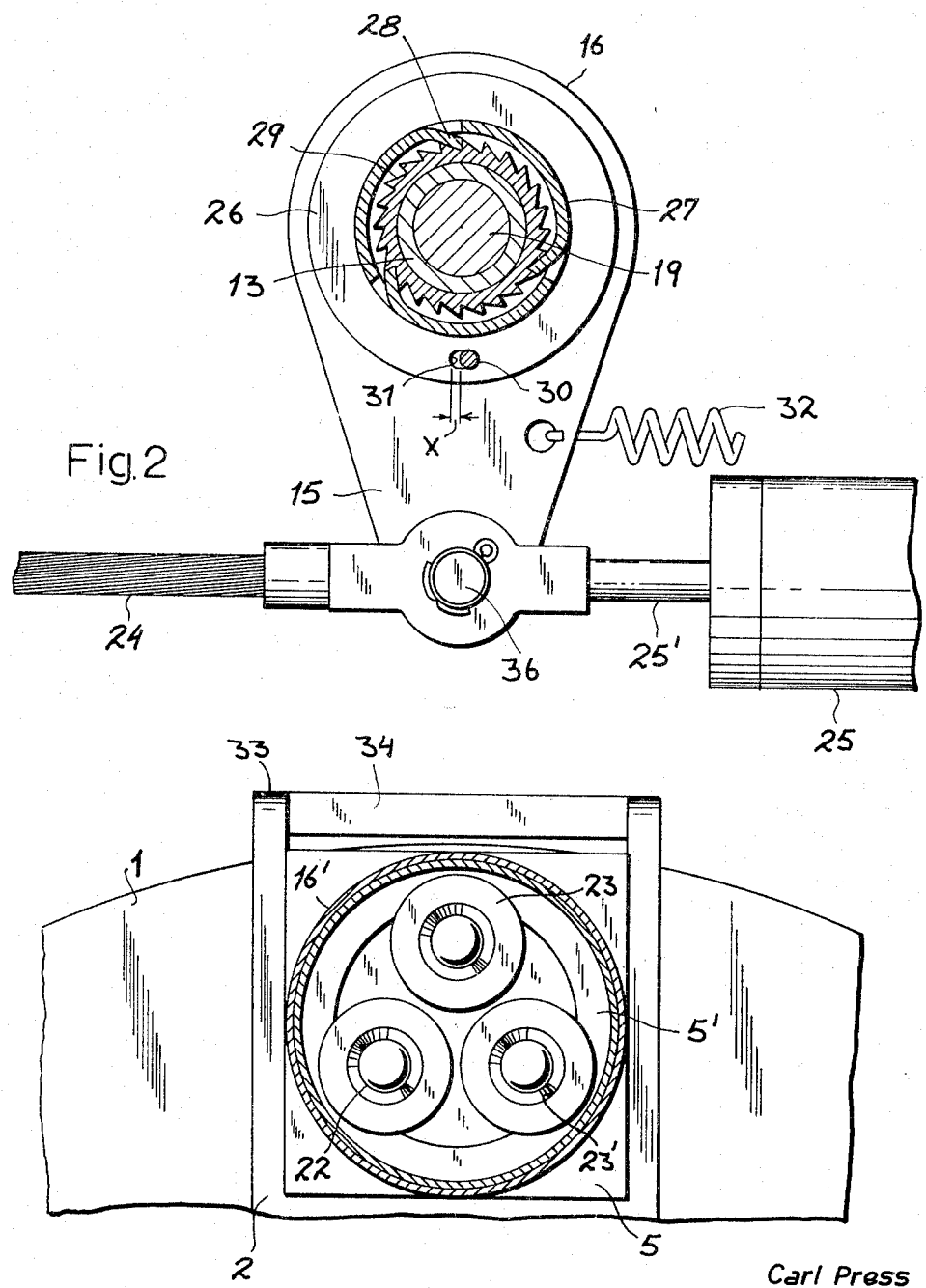

United States Patent Office 3,321,050
Patented May 23, 1967

3,321,050
CALIPER TYPE DISK BRAKE
Carl Press, Offenbach am Main, Germany, assignor to Alfred Teves Maschinen- und Armaturenfabrik K.G., Frankfurt am Main, Germany
Filed Oct. 23, 1964, Ser. No. 406,034
Claims priority, application Germany, Nov. 7, 1963, T 25,028
3 Claims. (Cl. 188—73)

My present invention relates to a brake, e.g. for automotive vehicles, wherein a disk fixed to, say, the shaft of a vehicle wheel is flanked by a pair of spaced-apart brake shoes which are offset from the disk axis and movable in a direction parallel to that axis for clamping a peripheral segment of the disk between their respective contact surfaces.

An object of this invention is to provide means in such a disk brake for readjusting, manually and preferably also automatically, the maximum separation of the two contact surfaces to compensate for wear of the brake shoes.

Another object of the instant invention is to provide a brake of this type which is of very compact construction.

A disk brake according to my invention, designed to realize the aforestated objects, comprises an operating member disposed alongside one of the brake shoes for displacement in a plane parallel to the disk, more specifically a swingable arm centered on the common axis of the two brake shoes; a camming mechanism interposed between the operating member and the adjoining brake shoe translates such a parallel motion of the operating member into a displacement of this brake shoe toward the disk, thereby clamping the disk between the two brake shoes, if the second, distal shoe is held stationary and moved concurrently in the opposite direction. Such opposite movement is brought about, pursuant to another feature of my invention, by making this second brake shoe rigid with one leg of a yoke-shaped structure which floatingly brackets the disk and has its other leg disposed as a backstop adjacent the operating member whereby any increase in the separation between the operating member and the first-mentioned or proximal brake shoe moves the brake shoes against opposite sides of the interposed disk segment.

In order to compensate for wear of the brake lining constituting the contact surfaces of the two shoes, another feature of my invention provides for the presence of a resetting element threadedly received in the backstop-forming leg of the yoke, any increase due to such wear in the maximum shoe spacing being readily eliminated by an advance of this resetting element toward the disk. The advance of the resetting member, advantagously a stud centered on the swing axis of the operating arm, takes place automatically if, in accordance with yet a further feature of the invention, a unidirectionally effective lost-motion coupling such as a pawl-and-ratchet assembly connects the arm with the resetting element for rotatively entraining the latter in response to reciprocations of this arm exceeding a predetermined stroke length.

The camming mechanism, according to still another feature of the present invention, comprises a set of roller bodies, such as balls, received between complementary housing portions which are respectively rigid with the operating arm and with the proximal brake shoe. Each housing portion consists of one or more parts with an annular array of depressions having a V-shaped profile at least when viewed in radial direction of the array; thus, these depressions may simply be conical if the roller bodies are of spherical configuration. As the housing rigid with the proximal brake shoe is restrained against rotation by the brake-shoe support, a swinging of the other housing portion by the operating arm about the center of the annular array causes the roller bodies to ride up the sloping surfaces or ramps of their depressions to force the two housing portions apart.

The invention will be described in greater detail with reference to the accompanying drawing in which:

FIG. 1 is a side-elevational view, partly in section, of a disk brake embodying the invention; and FIGS. 2 and 3 are cross-sectional views taken, respectively, on the lines II—II and III—III of FIG. 1.

The brake system shown in the drawing comprises a conventional brake disk 1 whose shaft 1' may support a wheel of an automative vehicle. Fixed to the vehicle frame is a generally J-shaped brake-shoe holder 2 which brakets the disk 1 and has legs 3, 4 formed with confronting cutouts 7, 8 slidably accommodating a pair of brake shoes 5, 6. These brake shoes, consisting of the usual brake-lining material such as sintered iron, are spaced apart in axial direction by a distance only slightly larger than the thickness of disk 1 so that a small reduction in their spacing will clamp a peripheral segment of the disk between their confronting contact surfaces. A yoke 9, straddling the holder 2 and the periphery of disk 1, has one leg 10 secured to the brake shoe 6 by means of a pair of screws 35 (only one shown), the other leg 11 of the yoke forming a backstop for an actuating assembly 12 interposed between this leg and the brake shoe 5.

The actuating assembly 12 includes an operating arm 15 which is swingable about the axis of an internally threaded sleeve 11' rigid with the leg 11 of yoke 9; this axis also passes through the centers of brake shoes 5 and 6 which, as shown in FIG. 3 for the shoe 5, may be of square or rectangular configuration. A stud 13 with male threads matingly engages the sleeve 11' and is provided with a slot 13' for operation by a screwdriver; a removable lid 14 is pressed into the outer end of sleeve 11' to protect the stud 13 from dust and dirt. The other end of stud 13 is recessed to accommodate a set of balls 20 which bear upon a disk 19.

The brake shoe 5 is recessed at three equispaced locations to accommodate a set of generally cup-shaped housing elements 23 with conical depressions 23', similar housing elements 17 are received in recesses of a disk 16 which is integral with arm 15 and has a central boss 18 in contact with disk 19. Boss 18 transmits the pressure of stud 13, applied to it via balls 20 and disk 19, to the housing elements 17 whose conical recesses 17' co-operate with the recesses 23' of counterpart elements 23 to hold in position a set of three spherical bodies 22. Disk 16 furthermore has a peripheral flange 16' embracing a similar flange 5' of brake shoe 5 which maintains the disk centered on the axis of stud 13 whereupon the array of balls 22 is centered. Thus, if arm 15 is swung by a small angle about that axis, the balls 22 ride up the ramps formed by the V-shaped profiles of depressions 17' and 23' so that the housing elements 17 and 23 are forced apart; this action urges the brake shoe 5 toward the left (as viewed in FIG. 1) and, through the intermediary of the floating yoke structure 9, tends to move the brake shoe 6 toward the right so that the two faces of disk 1 are clamped between the brake shoes. The swinging of arm 15 and disk 16 can be brought about either hydraulically with the aid of a fluid cylinder 25 and a piston 25', as when the driver of the vehicle steps upon the brake pedal, or manually with the aid of a cable 24 upon operation of the conventional hand brake. A restoring spring 32 tends to maintain the arm 15 in normal position, e.g. as defined by an abutment for piston 25' inside cylinder 25, in which the depressions 17' and 23' are mutually aligned so that the balls 22 are fully recessed therein. The free end of piston 25' is bifurcated and straddles the arm 15 with sufficient lateral clearance to facilitate a sideways shifting of this arm under pressure of the balls 22 and also upon a displacement of the stud 13 toward the left (FIG. 1) to compensate for wear of the brake linings; a pin 36 links the piston 25' and arm 15 with sufficient play to allow for the slight rotation of the arm required in the operation of the brake system.

In order to bring about an automatic adjustment of resetting stud 13 in response to wear of the brake shoes 5 and 6, I fixedly secure a ratchet ring 29 to the stud 13 and also provide a disk 26, centered on the stud axis, whose flange 27 has a set of resilient tongues 28 partly punched out toward the teeth of ratchet ring 29 so that these tongues will act as pawls adapted to rotate the ring 29 and the stud 13 clockwise (as viewed in FIG. 2) upon a similar rotation of arm 15. Disk 26 is, however, coupled to arm 15 with a certain play $x$ provided by a peg 30 on arm 15 and a slot 31 on disk 26 receiving this peg with clearance. The distance $x$ is normally sufficient to enable displacement of the brake shoes 5, 6 for clamping the disk 1 between them without advancing the stud 13.

If, however, either or both brake shoes 5, 6 have worn along their contact surfaces to increase the effective spacing therebetween so that the arm 15 swings past the distance $x$ before full contact is made with the disk 1, the pawl-and-ratchet mechanism 28, 29 will entrain the stud 13 so as to increase the pressure upon balls 20, disk 19 and boss 18 with consequent compensatory shifting of the arm 15 and the ramp carriers 17 away from leg 11, the threads of stud 13 and sleeve 11' being of sufficiently low pitch to prevent a spontaneous retrogression of the stud. The pawls 28 may be relatively staggered, with reference to the ratchet wheel 29, by fractions of a tooth division in order to increase the sensitivity of the automatic adjustment means 26–31.

The long leg 3 of shoe holder 2 is cut away at 34, in line with cutout 7, to provide a channel for sliding the brake shoe 5 past the bight 33 of the holder when the unit is to be disassembled for inspection or replacement of a worn brake shoe. Such disassembly requires merely the removal of screws 35 and the detachment of arm 15 from piston 25' upon withdrawal of pin 36, the yoke 9 and the unit 12 being then detachable together with brake shoe 5 from the holder 2 in the upward direction as viewed in FIGS. 1 and 3; the other brake shoe 6 may thereafter be removed axially from its cutout 8 in the short leg 4 of member 2.

It will be apparent that the ramp-forming housing elements 17 and 23, respectively rigid with disk 16 and brake shoe 5, can also be interconnected to constitute two ring-shaped housing portions. Also, the ratchet teeth of ring 29 and the direction of pawls 28 could be reversed (along with the thread of stud 13) to operate on the return rather than the forward stroke of the arm 15. These and other modifications, readily apparent to persons skilled in the art, are deemed to fall within the spirit and scope of my invention as defined in the appended claims.

I claim:

1. In combination with a rotatable brake disk, a brake assembly comprising first and second friction elements frictionally engageable with the opposite sides of said disk which respectively confront said first and second friction elements, a nonrotatable substantially U-shaped guide member straddling a portion of the periphery of said disk and having formed therein two opposed apertures disposed one on each side of said disk, adjacent the disk periphery and proportioned to receive said friction elements in slidable and nonrotatable relation therein, expander means comprised of first and second separable members arranged to be forced apart when one of such members executes angular movement with respect to the other member, means forming an operative engagement between one of said separable members and said first friction element to impart biasing effort theron, operating means attached to the other said members and angularly movable to effect rotation thereof, rigid caliper means straddling said disk and having one limb rigidly attached to one of said friction elements and having formed in the other limb thereof an axially-extending bore, said bore being internally screw threaded and disposed with the axis of such bore extending through substantially the center of each of said friction elements, threaded adjustment means positioned within said bore in screw threaded engagement therewith, said operating means being disposed between said threaded adjustment means and said expander means, thrust connection means between said adjustment means and one of said separable members to transmit brake-applying force to both said caliper and its attached second friction element and said first friction element thereby effecting engagement of both said friction elements against their respectively confronting surfaces of said disk, a pawl-and-ratchet device associated with said operating means for rotating said adjustment means relatively to said friction element means, said adjuster means being adapted to position both said separable members and said caliper means whereby the positions of said friction elements are defined by operation of said adjuster means in response to wear of said friction elements.

2. The brake structure in accordance with claim 1 wherein said threaded adjustment means is manually operable to effect positioning thereof to provide adjusted positions of said friction elements.

3. The disk brake structure in accordance with claim 1, wherein said expander means and said operating means are movable in unison by said threaded adjustment means to successive adjustable positions in relation to said rotatable brake disk.

References Cited by the Examiner

UNITED STATES PATENTS

| 2,820,530 | 1/1958 | Chouings et al. | 188—73 |
| 3,155,195 | 11/1964 | Brawerman | 188—73 |
| 3,185,263 | 5/1965 | Schanz et al. | 188—73 X |

FOREIGN PATENTS

| 1,231,537 | 4/1960 | France. |
| 1,273,257 | 10/1961 | France. |
| 1,345,151 | 10/1963 | France. |

MILTON BUCHLER, *Primary Examiner.*

G. E. A. HALVOSA, *Assistant Examiner.*